Nov. 25, 1969     M. A. HANKINS     3,480,250
UPRIGHT STAND WITH ADJUSTABLE LEG SPAN
Filed Aug. 31, 1967     2 Sheets-Sheet 1
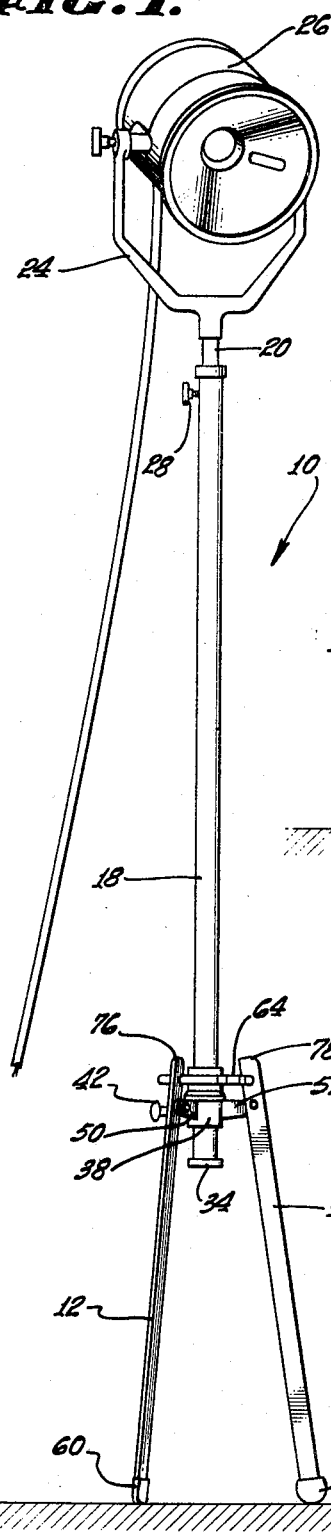
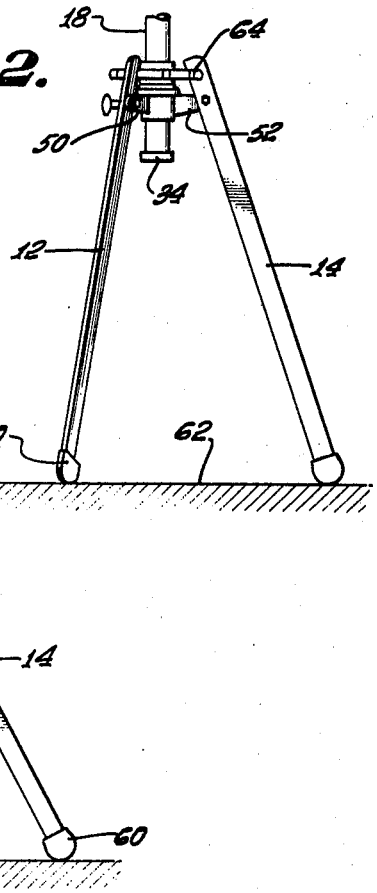
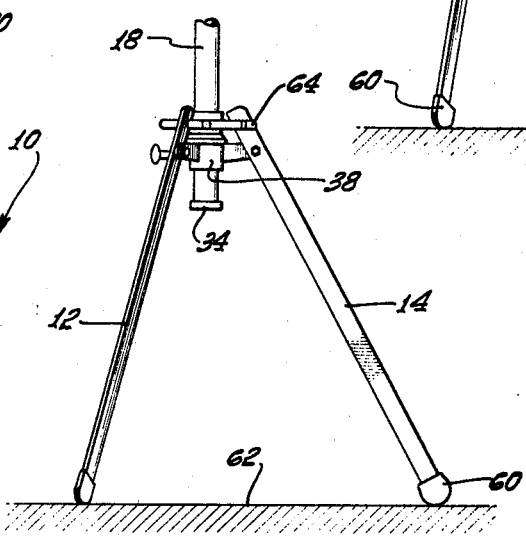
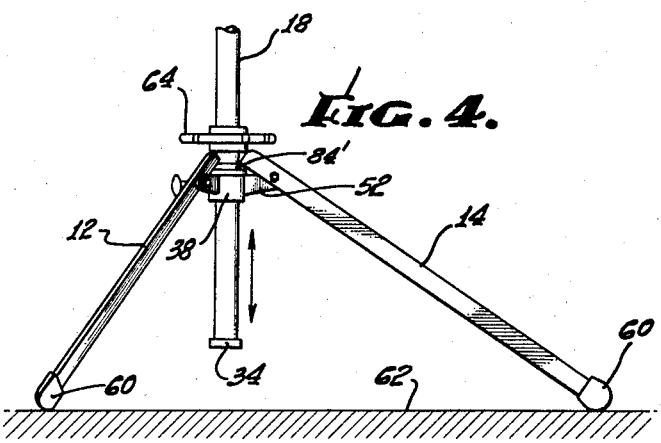
INVENTOR.
MAXEY A. HANKINS
By Huebner & Worrel
ATTORNEYS.

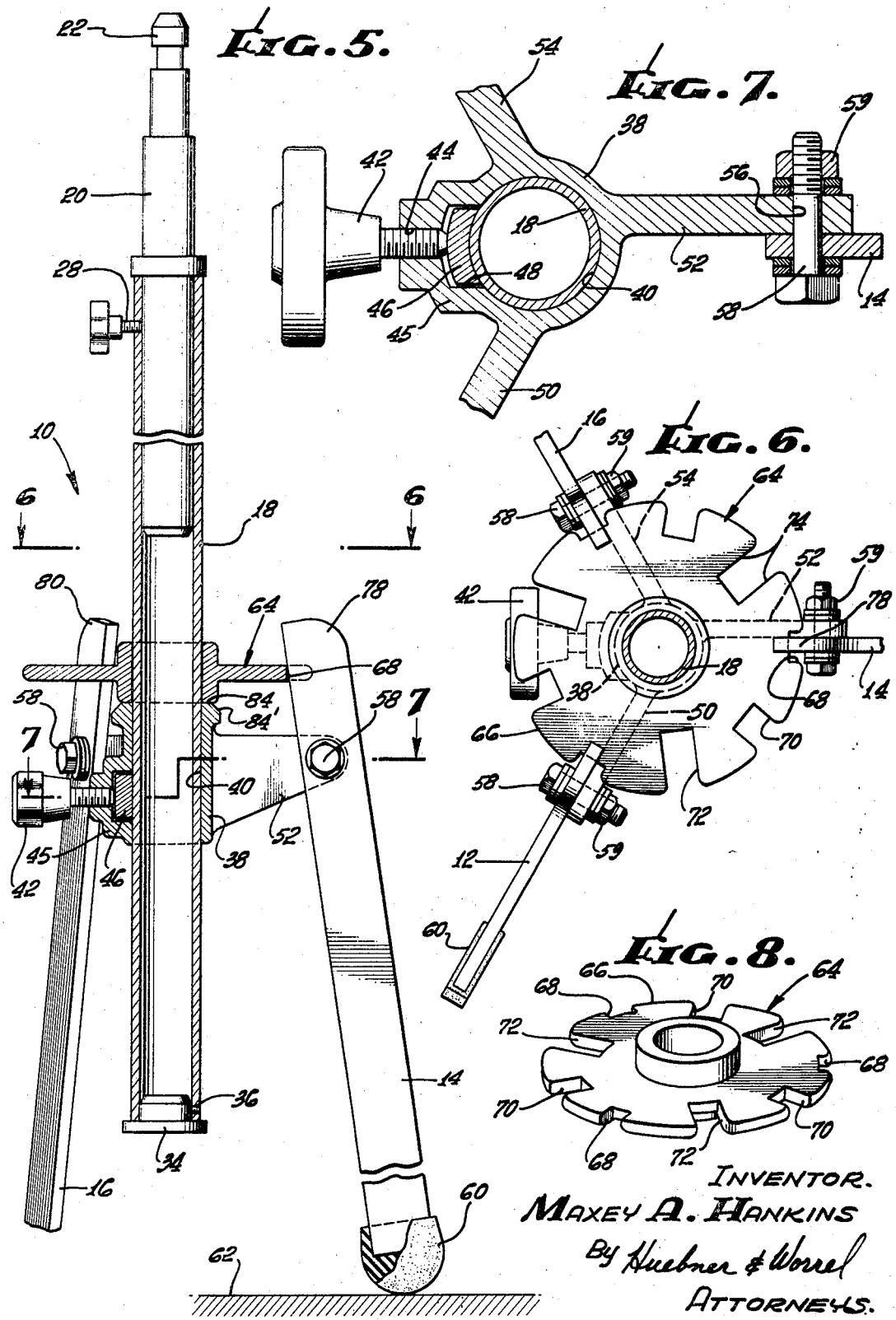

United States Patent Office 3,480,250
Patented Nov. 25, 1969

3,480,250
UPRIGHT STAND WITH ADJUSTABLE LEG SPAN
Maxey A. Hankins, Encino, Calif., assignor to Mole-Richardson Co., a corporation of California
Filed Aug. 31, 1967, Ser. No. 664,767
Int. Cl. F16m *11/38, 11/00*
U.S. Cl. 248—168                                                                    6 Claims

ABSTRACT OF THE DISCLOSURE

An upright stand, such as a tripod, provided with means to permit the manual adjustment of the span of the legs of the stand. The stand may be utilized for supporting lights, cameras, reflectors, projection screens, or the like.

BACKGROUND OF THE INVENTION

This invention relates to an upright stand, and more particularly, to a stand such as a tripod, having means for adjusting the span of the legs of the stand.

Upright stands, such as tripods, have been employed for many years for supporting such items as lights, cameras, reflectors, projecting screens, or the like. Such stands normally include three legs pivotally mounted to an upright tubular supporting member. The legs are normally pivotally mounted with respect to the tubular member in such a manner that the legs have only a single span, that is to say, the angle of the legs with respect to the longitudinal axis of the upright tubular member of the stand is fixed. It can be appreciated that the angle of the legs with respect to the longitudinal axis of the tubular supporting member of a stand determines not only the stability of the stand, but also the area in which the stand may be mounted. Since the conventional stand legs have a fixed span, it can be seen that oftentimes the stand cannot be employed in certain locations where the area in which the stand must be located is insufficient to accommodate the legs of the stand. In addition, the stability of the conventional stand cannot be altered to accommodate various environmental conditions, such as wind, which would necessitate a greater degree of stability for the stand.

Summary of the invention

It is the principal object of the present invention to provide an upright stand having a plurality of pivotally mounted supporting legs with means for adjusting the span of the legs.

According to the principal aspect of the present invention, an upright stand, such as a tripod, having a plurality of pivotally mounted legs is characterized by an annular plate which surrounds the upright supporting member of the stand. The plate is provided with a plurality of sets of notches in its outer periphery. Each set of notches has a different depth, and the notches are so arranged that a portion of the pivotally mounted legs of the stand may engage any one of the sets of notches, depending upon the rotational position of the annular plate. Since the depth of the notches of each set differs, the span of the legs of the stand may be altered by engaging the legs with different sets of the notches in the annular plate. Consequently, there is provided by the present invention means for manually adjusting the span of the legs of a supporting upright stand. Consequently, the span of the legs may be relatively small to permit the positioning of the stand in a confined area, or the span may be made relatively large to maximize the stability of the stand.

Other objects, aspects and advantages of the invention will become apparent from the following description taken in connection with the accompanying drawings, wherein:

Brief description of the drawings

FIGURE 1 is a side elevational view of a tripod employing the leg adjusting device of the present invention, with the legs of the tripod being shown in one position wherein the span of the legs is at a minimum;

FIGURE 2 is a fragmentary view of the lower portion of the tripod illustrated in FIGURE 1, showing the legs in a second position;

FIGURE 3 is a fragmentary view of the lower portion of the tripod illustrated in FIGURE 1, showing the legs in a third position;

FIGURE 4 is a fragmentary view of the lower portion of the tripod illustrated in FIGURE 1 showing the legs of the tripod in a fourth position;

FIGURE 5 is a side elevation, partially in section, of the tripod, particularly illustrating the leg pivoting and span adjusting means;

FIGURE 6 is a cross-sectional view taken along line 6—6 in FIGURE 5;

FIGURE 7 is a cross-sectional view taken along line 7—7 in FIGURE 5; and

FIGURE 8 is a perspective view of the adjusting plate for the legs of the tripod.

Description of the preferred embodiment

Referring now to the drawings in detail, wherein like reference numerals designate like or corresponding parts throughout the various views, there is shown in FIGURE 1, an upright supporting stand, generally designated by numeral 10, employing the leg span adjusting means of the present invention. The upright stand 10 is shown as being a tripod having three legs 12, 14 and 16, connected to an upright elongated tubular member 18. As best seen in FIGURE 5, a cylindrical member 20 is telescopically mounted within the tubular member 18, and has a fitting 22 at its upper end upon which there is mounted a yoke 24, seen in FIGURE 1. The yoke 24 pivotally mounts a lamp 26; it being understood, of course, that the yoke could carry other objects such as cameras, reflectors, projection screens, or the like. A set screw 28 is threaded through the tubular member 18 to engage the cylindrical member 20 so that the cylindrical member may be fixedly positioned vertically within the tubular member 18. A cap 34 closes the lower end of the tubular member 18, and is retained therein by means of a set screw 36 in the wall of the member 18.

A cylindrical collar 38, having a circular bore 40 therethrough, is slidably mounted on the tubular member 18. A set screw 42 is threaded through a passage 44 in a boss 45 of the collar 38, and abuts at its end against an arcuate shoe 46 positioned within a cavity 48 in the boss which opens to the passage 40. The shoe 46 engages the surface of the tubular member 18, and serves as a force transmitting element between the set screw 42 and the member 18. As is apparent by loosening the set screw 42, the vertical position of the tubular member 18 with respect to the collar 38 may be adjusted so that the vertical position of the lamp 26 may be set as desired.

Three outwardly extending arms 50, 52 and 54, extend from the collar 38, each having a horizontal bore 56 adjacent its outer end. The legs 12, 14 and 16 are pivotally mounted to the arms 50, 52 and 54, respectively, by means of bolts 58 extending through the bores 56, and secured by nuts 59.

As best seen in FIGURE 7, the arms 50, 52 and 54 of the collar 38 do not extend exactly radially outwardly from the longitudinal axis of the collar 38, but rather, are offset slightly from such axis. As a consequence, the legs 12, 14 and 16, being mounted against corresponding faces of the arms, result in their longitudinal axes being in almost exact radial alignment with the axis of the collar 38.

Thus, the legs are spaced 120 degrees apart, so that the stability of the stand may be maximized. The legs carry rubber feet 60 at their lower ends to prevent slippage of the legs with respect to the supporting surface 62 of the stand 10.

In accordance with the principal feature of the present invention, an annular adjusting plate 64 is slidably mounted upon the tubular member 18 above the collar 38. Consequently, the plate 64 is disposed above the horizontal axes about which the legs 12, 14 and 16 are pivotally mounted, such axes being the longitudinal axes of the horizontally positioned bolts 58. The plate 64 has three sets of generally radially extending notches formed adjacent to its outer periphery 66. The first set of notches includes three shallow notches 68; the second set of notches includes three deeper notches 70; and the third set of notches includes the three deepest notches 72. Each of the notches of a set is spaced 120 degrees from each other so as to correspond to the spacing of the legs 12, 14 and 16. As best seen in FIGURE 6, the center line of each of the notches is aligned with the axis of the collar 38, so that the notches generally extend radially inwardly from the periphery of the plate 64, yet the sides 74 of each of the notches are parallel with respect to one another.

Each of the legs 12, 14 and 16 includes an upper portion 76, 78 and 80, respectively, extending above the horizontal axes of the bolts 58. Such upper portions of the legs are adapted to engage one of the sets of notches in the plate 64 when aligned therewith, and when the plate is supported by the upper surface 84 of the collar 38. To disengage the upper portions of the legs of the stand from the notches in annular plate 64, the stand is lifted and the lower ends of the legs are pushed inwardly. The plate 64 may then be raised above the ends of the legs and rotated to align a different set of notches with the upper portions of the legs. In this fashion, the legs may be engaged in any of the three sets of notches provided in the plate 64. When the stand is set again upon the supporting surface 62, the upper portions of the legs bear against the inner ends of the notches. Hence, the angle or span of the legs of the stand is determined by the depth of the notches engaged by said upper portion of the legs.

As seen in FIGURES 6 and 8, each of the notches in plate 64 widens at the periphery of the plate, by chamfering or radiusing the junctions of the side walls 74 with the outer periphery of the plate, to facilitate entry of the upper portions of the legs 12, 14 and 16 into the notches.

Positioning of the legs in the shallow notches of the plate 64 is illustrated in FIGURE 1; in the intermediate notches in FIGURE 2; and in the deepest notches in FIGURE 3. In addition, by lifting the plate 64 above the upper ends of the legs, the legs may be shifted to a fourth position wherein the upper portions of the legs bear directly against the upper frusto-conical bearing surface 84' of the collar 38, as shown in FIGURE 4. With this arrangement, the collar is merely dropped to rest upon the upper ends of the legs.

While the present embodiment has been described in connection with a tripod, that is, a stand having three legs, it can, of course, be appreciated that the invention is applicable to stands having more than three legs, in which case, the number of notches in each of the sets of notches in the plate 64 would equal the number of legs pivotally mounted about the collar 38. In addition, the notches of each of the sets would have to be spaced a distance apart equal to the spacing between the legs which support the stand. Also, any number of sets of notches could be provided in the plate 64, depending upon the number of adjustments of the span of the legs of the stand desired.

Although I have herein shown and described my invention in which I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures and devices.

What is claimed is:

1. An upright stand comprising: a vertical elongated tubular supporting member; at least three angularly spaced legs extending radially outwardly and downwardly from a portion of said member; means pivotally mounting said legs to said member about horizontal axes whereby said legs are pivotable vertically about said axes; a portion of each of said legs extending above said horizontal axes; an annular plate slidably and rotatably mounted on said member above said horizontal axes; said plate having a plurality of sets of radially extending notches formed in the outer periphery thereof; the number of notches in each of said sets of notches being equal to the number of legs mounted to said member; the notches of each of said sets of notches being angularly spaced apart a distance equal to the distance between said angularly spaced legs whereby said upwardly extending portions of said legs are adapted to engage the notches of any one set of said notches when in alignment therewith; and the notches of each of said sets of notches extending radially inwardly from said outer periphery of said plate a distance different than that of the notches of the other sets of notches whereby the angle of said legs with respect to the longitudinal axis of said member may be altered by selective rotational positioning of said plate relative to said legs to cause said portions of said legs to engage different sets of said notches.

2. A stand as set forth in claim 1, wherein said number of legs and number of notches in each of said sets of notches is three, and said legs and notches of each of said sets of notches are spaced apart approximately 120°.

3. A stand as set forth in claim 1, wherein said legs are mounted to said member by means of a collar; said collar having a cylindrical vertically disposed bore therethrough embracing said member in sliding relationship therewith; said collar having a number of arms extending horizontally therefrom equal to said number of legs; each of said legs being pivotally mounted to said arms; and means for adjustably fixing the relative axial positioning of said collar and said member.

4. A stand as set forth in claim 1, wherein said notches widen at said outer periphery of said plate.

5. An upright stand comprising; a collar having a cylindrical, vertically disposed bore therethrough; an elongated tubular member slidably mounted within said bore; means for adjustably fixing said collar to said member; three legs extending radially outwardly and downwardly from said collar, said legs being spaced apart approximately 120°; means pivotally mounting said legs to said collar about horizontal coplanar axes whereby said legs are pivotable vertically about said axes; a portion of each of said legs extending above said horizontal axes; an annular plate slidably and rotatably mounted on said member above said horizontal axes; said plate having a plurlity of sets of radially extending notches formed in the outer periphery thereof, the notches of each of said sets being spaced apart approximately 120° whereby said portions of said legs are adapted to engage the notches of any one set of said notches when in alignment therewith; and the notches of each of said sets extending radially inwardly from said outer periphery of said plate a distance different than that of the notches of the other sets whereby the angle of said legs with respect to the longitudinal axis of said member may be altered by selective rotational positioning of said plate relative to said collar to cause said portions of said legs to engage different sets of said notches.

6. A stand as set forth in claim 5, wherein said notches widen at the outer periphery of said plate.

(References on following page)

References Cited

UNITED STATES PATENTS

| | | | |
|---|---|---|---|
| 730,062 | 6/1903 | Widmer | 248—170 |
| 963,129 | 7/1910 | Feldman | 248—170 |
| 1,144,726 | 6/1915 | Robinson et al. | 248—170 |
| 1,290,809 | 1/1919 | Truax | 248—170 |
| 1,745,845 | 2/1930 | Ebbecke | 248—170 |
| 2,502,667 | 4/1950 | Pagett | 248—170 |
| 2,587,511 | 2/1952 | Nerman | 248—168 |
| 2,633,319 | 3/1953 | Musial | 248—168 |

FRANCIS K. ZUGEL, Primary Examiner

U.S. Cl. X.R.

248—161, 170